(12) United States Patent
Ylirinne et al.

(10) Patent No.: US 10,917,269 B2
(45) Date of Patent: Feb. 9, 2021

(54) INTEGRATED SERIAL COMMUNICATION

(71) Applicant: Vacon Oy, Vaasa (FI)

(72) Inventors: Petri Ylirinne, Vaasa (FI); Trygve Björkgren, Kvevlax (FI); Stefan Strandberg, Vörå (FI)

(73) Assignee: VACON OY, Vaasa (FI)

( * ) Notice: Subject to any disclaimer, the term of this patent is extended or adjusted under 35 U.S.C. 154(b) by 0 days.

(21) Appl. No.: 16/473,380

(22) PCT Filed: Jan. 17, 2017

(86) PCT No.: PCT/EP2017/050877
§ 371 (c)(1),
(2) Date: Jun. 25, 2019

(87) PCT Pub. No.: WO2018/133920
PCT Pub. Date: Jul. 26, 2018

(65) Prior Publication Data
US 2020/0153665 A1 May 14, 2020

(51) Int. Cl.
H04L 25/40 (2006.01)
H04L 7/00 (2006.01)

(52) U.S. Cl.
CPC ............ *H04L 25/40* (2013.01); *H04L 7/0041* (2013.01)

(58) Field of Classification Search
CPC ....... H04L 7/044; H04L 7/0037; H04L 25/40; H04L 7/0041
USPC ......... 375/357, 297, 211, 219–220, 260, 257
See application file for complete search history.

(56) References Cited

U.S. PATENT DOCUMENTS

| | | | |
|---|---|---|---|
| 5,603,012 A * | 2/1997 | Sotheran | G06F 9/3867 712/208 |
| 6,151,334 A | 11/2000 | Kim et al. | |
| 6,226,325 B1 * | 5/2001 | Nakamura | G11B 20/00007 375/240 |
| 2003/0179764 A1 * | 9/2003 | Gudgeon | H04L 12/10 370/423 |
| 2004/0141570 A1 * | 7/2004 | Yamazaki | H04L 27/2665 375/340 |
| 2005/0111585 A1 * | 5/2005 | Stojanovic | H04L 25/063 375/316 |

(Continued)

FOREIGN PATENT DOCUMENTS

| | | |
|---|---|---|
| CN | 1516809 A | 8/2004 |
| CN | 102577289 A | 7/2012 |

(Continued)

OTHER PUBLICATIONS

International Search Report for Serial No. PCT/EP2017/050877 dated Mar. 31, 2017.

*Primary Examiner* — Emmanuel Bayard
(74) *Attorney, Agent, or Firm* — McCormick, Paulding & Huber PLLC

(57) ABSTRACT

An electric system comprising communication link between a signal transmitting end and a signal receiving end, wherein, at the signal transmitting end, a number of data bits are integrated into a low frequency signal to form an integrated signal. Each data bit is transmitted as part of a symbol. Each symbol comprises a predefined number of bits encoding at least one data bit, the state of some of the bits of each symbol being dependent on the state of the low frequency symbol.

14 Claims, 2 Drawing Sheets

(56) References Cited

U.S. PATENT DOCUMENTS

| | | | | |
|---|---|---|---|---|
| 2006/0227023 | A1* | 10/2006 | Ahn | G06T 9/001 |
| | | | | 341/87 |
| 2011/0248835 | A1* | 10/2011 | Speegle | G08C 19/02 |
| | | | | 340/12.32 |
| 2012/0207226 | A1* | 8/2012 | Gohshi | G10L 19/0212 |
| | | | | 375/240.25 |
| 2016/0127109 | A1* | 5/2016 | Shimosakoda | H04B 17/309 |
| | | | | 370/276 |

FOREIGN PATENT DOCUMENTS

| | | |
|---|---|---|
| CN | 102598668 A | 7/2012 |
| CN | 105991499 A | 10/2016 |
| EP | 1737174 A1 | 12/2006 |

\* cited by examiner

INTEGRATED SERIAL COMMUNICATION

CROSS-REFERENCE TO RELATED APPLICATIONS

This application is a National Stage application of International Patent Application No. PCT/EP2017/050877, filed on Jan. 17, 2017, which is hereby incorporated by reference in its entirety.

TECHNICAL FIELD

The present invention relates to serial communication.

BACKGROUND

In many electrical devices there is a need for various kinds of communication between parts of the system. For example, a power electronic converter such as a frequency converter generally comprises control and power parts, called as a control unit and a power unit in this document. These parts normally may have mutual signal communication at a relatively low frequency (e.g. power switch control, typically less than 20 kHz) and mutual serial communication at a relatively high frequency (e.g. status and measuring data packed in serial communication messages, typically over 10 Mbit/s).

The normal way to arrange the communications between parts of the system is to use an own connection hardware for each communication type. E.g. in a power electronic converter the control unit normally controls the power unit by using power switch specific gate control wires, and a similar individual wire/signal arrangement may also be used by some time-critical feedback signals from the power part, e.g. by a fault-signal. In order to limit the number of physical wires the non-time-critical control data from the control unit to the power unit and the feedback data from the power unit to the control unit are normally transmitted via a high frequency data link in serial communication message format.

A potential difference between the signal sending and receiving parts requires signal isolation. In a power electronic device the control unit is normally located at ground potential and the power unit at hazardous main circuit potential, which potential difference causes a requirement to isolate all signals between these units by using e.g. optocouplers. This may be a problem due to cost, space and reliability targets, which makes it advantageous to keep the number of signals between the units as low as possible.

SUMMARY

The object of the present invention is to provide a novel communication method and arrangement for an electric system having a simultaneous need for different kinds of mutual communication between system parts. According to the invention, serial communication messages are integrated into low frequency signals, thus reducing the number of necessary wires in the communication between the parts. The term "low frequency signal" in this context might, for example, mean a signal whose frequency is less than 10% of the clock frequency which is used to form the serial communication messages. The following is a brief summary in order to provide basic understanding of some aspects of various embodiments of the invention, a more detailed description of exemplifying embodiments are given later. The objective of the invention is achieved by what is stated in the independent claims, other preferred embodiments are disclosed in the dependent claims.

According to the present invention, at the signal transmitting end of the communication link a serial communication message is integrated into a low frequency signal to form an integrated signal in accordance with at least some of the following operating rules:

Each data bit of the serial communication message is transmitted as part of a so-called symbol. A symbol may comprise a predefined number of bits for identifying the symbol start and a predefined number of bits for identifying the data bit state. One bit in this context typically corresponds to one clock cycle. A symbol may include one or several data bits. Due to the predefined number of bits the duration of a symbol is typically constant.

The state of the integrated signal during at least some of the symbol bits is advantageously dependent on the state of the low frequency signal.

A number of symbols form a byte. A byte may be identified by a separate byte start symbol, or by a separate byte stop symbol or a byte may comprise these both identifying symbols.

The symbols are separated from each other by a time delay, which is longer than the filtering delay of the low frequency signal at the receiving end of the communication link. The time delay between symbols may be extended if a pulse edge of the low frequency signal occurs within a margin of safety of a symbol.

According to the present invention, at the signal receiving end of the communication link the integrated signal may be divided into a separate serial communication message and a separate low frequency signal in accordance with at least some of the following operating rules:

The data bits, included in the symbol of the integrated signal, are decompressed in a decoder which is able to identify the bits inside a symbol according to the rules described above.

The integrated signal is delayed by a constant filtering delay in order to ensure that no symbol is visible in the filtered signal. Advantageously the filtering delay may be longer than the duration of one symbol. Due to the constant filtering delay time, the internal timing of the signal pattern stays unchanged.

According to the present invention, the method for transmitting a serial communication message integrated in a low frequency signal may comprise the implementation of the above operating rules at the transmitting end and at the receiving end of the communication, respectively. The method can be used in both directions in the data transmission between the control and power units. For example, the control unit may integrate a serial communication message into the power switch control signal for asking feedback status information, and the power unit may integrate the feedback status information, e.g. the heatsink temperature, in a serial communication message integrated in a fault feedback signal.

According to the present invention, an apparatus or a system for transmitting a serial communication message integrated in a low frequency signal comprises at the transmitting end of the communication link digital logic circuit(s), capable to encode the data bits of a serial communication message in symbols and to integrate the symbols in a low frequency signal according to the above operating rules. The apparatus or a system can be based on digital logic circuit(s) with a prefixed function, e.g. a CPLD (complex programmable logic device) or it can be based on a digital logic circuit with a downloadable software, i.e. a programmable microprocessor. Respectively, the apparatus or a system at the receiving end of the communication link may comprise digital logic circuit(s), comprising one or more of:
- a delay function for separating the low frequency signal from the received integrated signal according to the above operating rules, and
- a communication decoder for separating the serial communication message data bits from the received integrated signal bit stream, according to the above operating rules.

In the data transmission between system parts, e.g. between the control and power units of a frequency converter, the arrangement for transmitting integrated signals can be used in both directions.

In an apparatus according to the present invention, which is based on a digital logic circuit with a downloadable software, e.g. a microprocessor, the present invention comprises also a new computer program, i.e. a software package which can be downloaded to a memory device. The computer program comprises computer executable instructions for implementing the above operating rules for transmitting a serial communication message integrated in a low frequency signal.

The present invention comprises also a new computer program product, comprising a non-volatile computer readable medium, e.g. a compact disc "CD", encoded with a computer program for transmitting a serial communication message integrated in a low frequency signal.

The present invention comprises also a power electronic converter, e.g. a frequency converter, wherein the method and arrangement for transmitting a serial communication message integrated in a low frequency signal is implemented.

The present invention is beneficial over the prior art technology in that the number of physical wires between devices with mutual communication can be decreased. Thus the assembly work is simplified, system cost and possibility for incorrect installation is reduced and the service work is easier.

The invention is best understood on the basis of the following description and accompanying drawings, comprising various exemplifying and non-limiting embodiments together with additional objects and advantages thereof.

BRIEF DESCRIPTION OF FIGURES

Below the invention appears a more detailed explanation using examples with references to the enclosed figures, wherein.

DETAILED DESCRIPTION

Figure 1:
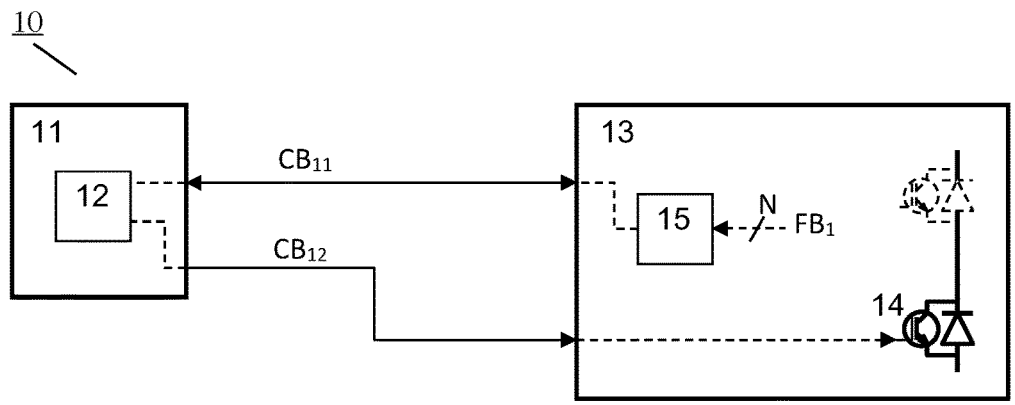
FIG. 1 presents communication channels in an electric device.

FIG. 1 presents a simplified schematic illustration of a power electronics device 10 comprising of a control unit 11 and a power unit 13. The control unit 11 includes a controller 12, which may be e.g. a microprocessor executing a program, which determines how the power electronics device 10 operates. The controller 12 sends control signals (e.g. turn on/turn off) to the power electronic switch 14 in the power unit via the control cable $CB_{12}$ which comprises a control wire for each power electronic switch. The signal frequency in this kind of a communication link between the control and power units is normally quite low due to the limitations of the operation frequency (called also as the switching frequency) of the power electronic switches. E.g. by IGBTs the normally used switching frequency is below 20 kHz.

The example of FIG. 1 presents also another communication link between the control and power units, a bidirectional communication link $CB_{11}$. It may be used e.g. for asking for and sending feedback data $FB_1$ from the power unit 13 to the control unit. The data is collected by a power unit controller 15, and it is transmitted in form of serial communication messages. A normal communication speed in this kind of an information channel is higher than 100 kbit/s.

Figure 2:
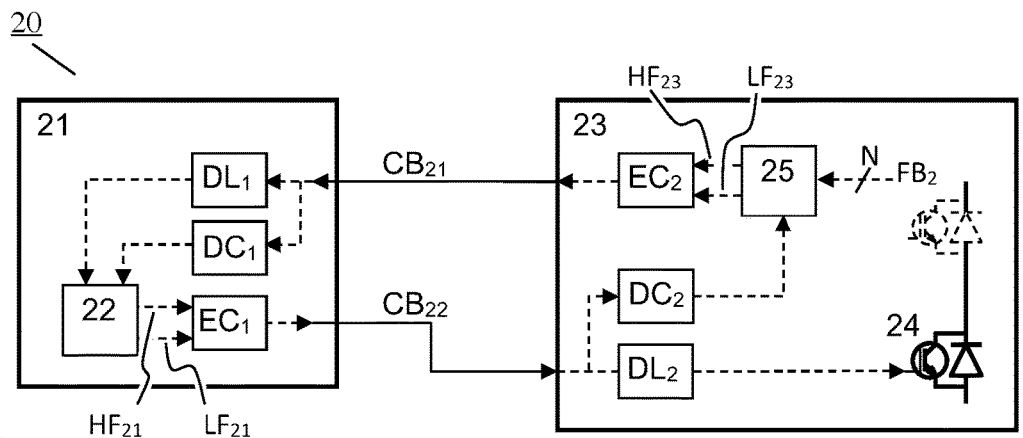
FIG. 2 presents communication arrangements in an electric device.

FIG. 2 presents a simplified schematic illustration of a power electronics device 20, which is similar to that presented in FIG. 1 comprising a control unit 21 and a power unit 23. The control unit 21 includes a controller 22 and the power unit 23 includes a controller 25. In this arrangement, the controller 22 of the control unit 21 sends a first data stream $HF_{21}$, comprising serial communication messages, and a second data stream $LF_{21}$, comprising a control signal for a power electronics switch, to an encoder $EC_1$ that encodes both data streams into an integrated signal stream according to this invention. From the encoder $EC_1$ the integrated signal stream is sent to the power unit 23 via an unidirectional serial communication link $CB_{22}$. The first and second data streams are separated at the power unit 23 end by a delay block $DL_2$ and a decoder block $DC_2$. In the delay block $DL_2$ the serial communication messages are filtered out such that only the second data stream $LF_{21}$ is left, as delayed, for controlling a power electronics switch 24. In the decoder block $DC_2$ the first data stream, i.e. the serial communication messages, is separated from the integrated signal stream and fed to the controller 25 of the power unit 23. The serial communication message may include e.g. a specified request for feedback data from the power unit to the control unit.

The controller 25 of the power unit can use a similar communication method and arrangement as explained above for sending feedback data $FB_2$ to the control unit 21. In the presented example a serial communication data stream $HF_{23}$ and a low frequency data stream $LF_{23}$ are encoded in an encoder $EC_2$ into an integrated signal stream which is sent via an unidirectional serial communication link $CB_{21}$ to the control unit 21 and separated there in the delay block $DL_1$ and the decoder block $DC_1$, as presented above. The low frequency signal in this data transmission may be e.g. a fault signal.

The logical functions in the control unit 21 as well as in the power unit 23, may be put into practice by using digital logic circuits based on a prefixed function, e.g. a CPLD (complex programmable logic device) or by using digital circuits based on a downloadable software, e.g. a microprocessor.

Figure 3:
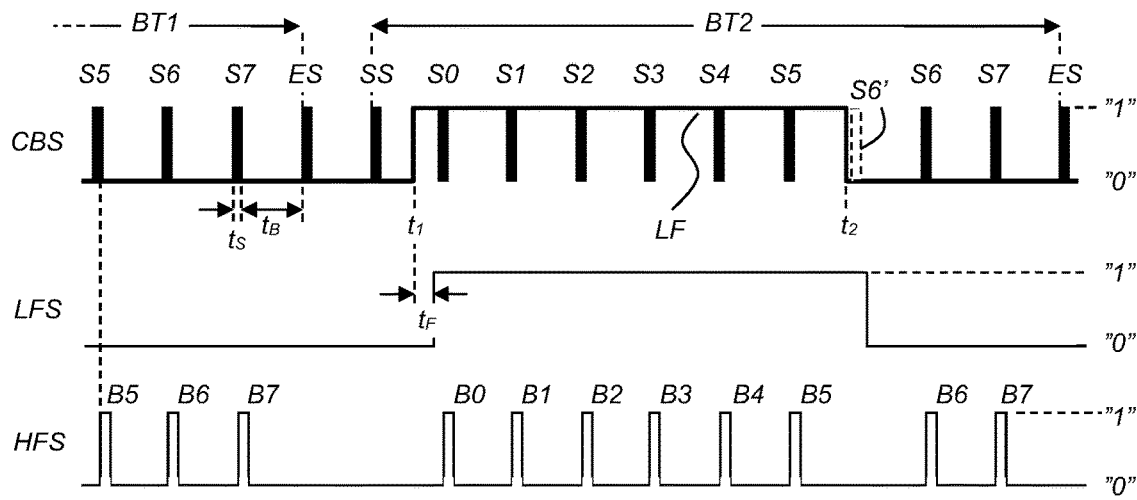
FIG. 3 illustrates signal streams suitable for use in the electric device of FIG. 2.

FIG. 3 illustrates an example of signal bit streams according to the present invention. CBS is an integrated signal, comprising of
- a low frequency signal LF, which is in logical "0" state until time instant $t_1$, stays in "1" state from $t_1$ to $t_2$, and returns to "0" position after time instant $t_2$, and
- a serial communication signal, comprising pulsed signal cycles S5, S6 . . . , called as symbols in this document.

The duration of a symbol is constant $t_S$, and each symbol is separated from the previous symbol by a time delay $t_B$.

A predefined number of data symbols, in this example 8 (S0 . . . S7), form a data byte (BT1, BT2) which has a specified start symbol SS and a specified stop symbol ES.

According to the invention, if the pulse edge of the low frequency signal LF occurs within a margin of safety from a symbol, that symbol is not sent at its original time slot but one period later (in FIG. 3, S6 is postponed from S6' because of an overlap with LF signal edge at $t_2$).

In the delay block ($DL_1$, $DL_2$ in FIG. 2) the integrated signal is delayed by a constant filtering time $t_F$. Because delay $t_F$ is longer than duration $t_S$, the symbol stream does not appear in the delayed signal pattern LFS. Due to the constant filtering delay $t_F$ and the margin of safety rule above the delayed signal pattern LFS always keeps the same form as the original signal pattern LF, which is important when this invention is applied in time-critical applications, e.g. in controlling IGBTs in PWM frequency converters.

In the decoder block ($DC_1$, $DC_2$ in FIG. 2) the data bit content HFS (B0 . . . B7) of each byte are separated from the symbols. For clarity, in FIG. 3 all data bit states are marked as "1" and each symbol carries only one data bit.

According to the present invention, the integrated signal CBS is delayed by a constant filtering delay $t_F$ in order to ensure that no symbol is visible in the filtered signal LFS. Advantageously the filtering delay $t_F$ is longer than the duration $t_S$ of a symbol. This rule guarantees that the internal signal edges of a symbol are not mixed with the signal edge of the low frequency signal LF.

Another timing related rule according to the present invention is that the delay $t_B$ between the symbols is longer than the filtering delay $t_F$. This rule guarantees that the signal edges during a symbol period do not disturb the timing of the low frequency signal delay $t_F$.

Figure 4:
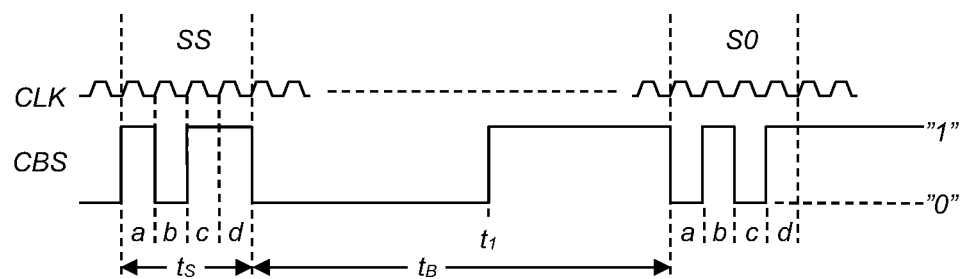
FIG. 4 illustrates details of a combined signal data stream.

FIG. 4 illustrates an example how the symbols (SS and S0 in FIG. 3) in the integrated signal CBS data stream may be formed according to the present invention. CLK denotes an internal clock of encoder blocks ($EC_1$, $EC_2$ in FIG. 2), and each symbol lasts 4 clock cycles, denoted as a, b, c and d. The rules for the signal states during each symbol cycle are in this example the following:

a=inverted low frequency signal state
b=non-inverted low frequency signal state
c="1" in data symbol if either the data bit is "0" or the symbol is a byte start symbol
"0" in data symbol if either the data bit is "1" or the symbol is a byte stop symbol
d="1" in data symbol if either the data bit is "1" or the symbol is a byte start symbol
"0" in data symbol if either the data bit is "0" or the symbol is a byte stop symbol According to the above rule, the values a and b of the start symbol SS are 10 (since the low frequency signal state before the symbol SS was 0) and the values c and d of the start symbol SS are 11 (since the symbol is a byte start symbol). Thus, the start symbol SS is a bit sequence 1011 as illustrated in FIG. 4.

According to the above rule, the values a and b of the first data symbol S0 are 01 (since the low frequency signal state before the symbol S0 was 1) and the values c and d of the first data symbol S0 are 01 (since the data bit being transmitted is "1". Thus, the first data symbol S0 if a bit sequence 0101 as illustrated in FIG. 4.

According to the present invention, the rule how to form the symbol may be other than the above, as long as the byte start and/or stop and the data bit(s) can be recognized. E.g. the byte stop bits may be left out when the number of symbols after the byte start is fixed. It is also possible that different types of symbols comprise different number of bits, e.g. such that more than one data bit is included in a data symbol.

A dimensioning example: According to the example above each symbol lasts 4 clock cycles. Thus in case of 10 MHz clock frequency a symbol duration is is 400 ns. The filtering delay $t_F$ should be clearly longer than this, e.g. 1 µs, in order to avoid misinterpretation of a symbol signal edge as a low frequency signal edge. And further, the delay $t_B$ between the bytes should be clearly longer, e.g. 4 µs, than the filtering delay in order to avoid disturbance of the filtering delay timing. Transmitting of one symbol in this example takes 4 µs+400 ns, i.e. the data signal transmission frequency is 1/4.4=0.23 Mbit/s.

The operating principle of the present invention does not set any strict limits for the frequency of the signals, but in practice it is best applicable if the signal frequency of LF is less than 10% of the clock frequency CLK (e.g. LF less than 50 kHz and CLK higher than 1 MHz).

The specific examples provided in the description above are not exhaustive unless otherwise explicitly stated, nor should they be construed as limiting the scope and/or the applicability of the accompanied claims. The features recited in the accompanied dependent claims are mutually freely combinable unless otherwise explicitly stated. The verbs "to comprise" and "to include" are used in this document as open limitations that neither exclude nor require the existence of also un-recited features. Furthermore, it is to be understood that the use of "a" or "an", i.e. a singular form, throughout this document does not exclude a plurality.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for integrating a serial communication message, comprising a plurality of data bits, into a low frequency signal to form an integrated signal at a transmitting end of a communication link of an electric system, the integrated signal being sent from the transmitting end of the communication link to a receiving end of the communication link, wherein:

each of the plurality of data bits is transmitted as a part of a symbol,
each of symbols comprises a predefined number of bits encoding at least one data bit,
the state of some of the bits of each of the symbols are dependent on the state of the low frequency signal,
the symbols are formed into bytes, which are identified by a separate start symbol, or by a separate stop symbol, or by both a start and a stop symbol, and
the symbols are separated from each other by a time delay which is longer than a filtering delay of the integrated signal at the receiving end of the communication link;
wherein each of the symbols comprises two or more bits used to mark the beginning of the symbol and two or more bits used to encode the data bit or to indicate that the symbol is a start symbol or a stop symbol; and
wherein the bits used to encode the data bit or to indicate that the symbol is the start symbol or the stop symbol (denoted below as c, d) are:

c="1" if the data bit is "0" or if the symbol is a byte start symbol
"0" if the data bit is "1" or if the symbol is a byte stop symbol
d "1" if the data bit is "1" or if the symbol is a byte start symbol
"0" if the data bit is "0" or if the symbol is a byte stop symbol.

2. The method according to claim 1, wherein at the receiving end of the communication link:
the data bits, included in the symbols of the integrated signal, are decompressed from an integrated signal bit stream in a decoder.

3. The method according to claim 1, wherein at the receiving end of the communication link:
the low frequency signal is separated from the integrated signal by delaying the integrated signal by a filtering delay which is longer than a duration of one symbol.

4. The method according to claim 1, wherein the bits used to mark the beginning of the symbol (denoted below as a, b) are:
a=inverted low frequency signal state
b=non-inverted low frequency signal state.

5. The method according to claim 1, wherein if a pulse edge of the low frequency signal occurs within a margin of safety of a symbol, the transmission of that symbol from the transmitting end of the communication link to the receiving end of the communication link is delayed.

6. The method according to claim 1, wherein the filtering delay of the integrated signal at the receiving end of the communication link is longer than the duration of each of the symbols.

7. The method according to claim 2, wherein at the receiving end of the communication link:
the low frequency signal is separated from the integrated signal by delaying the integrated signal by a filtering delay which is longer than a duration of one symbol.

8. The method according to claim 2, wherein each of the symbols comprises two or more bits used to mark the beginning of the symbol and two or more bits used to encode the data bit or to indicate that the symbol is a start symbol or a stop symbol.

9. An apparatus for integrating a serial communication message, comprising a plurality of data bits, into a low frequency signal to form an integrated signal at a transmitting end of a communication link of an electric system comprising a transmitter, a receiver and the communication link between the transmitter and the receiver, the apparatus comprising at least one logic circuit configured to:
encode each of the plurality of data bits to be transmitted into symbols;
integrate the symbols in the low frequency signal to form the integrated signal, wherein the state of some of the bits of each of the symbols are dependent on the state of the low frequency signal,
form the symbols into bytes, which are identified by a separate start symbol, or by a separate stop symbol, or by both a start and a stop symbol, and
separate the symbols from each other by a time delay which is longer than the filtering delay of the integrated signal at the receiving end of the communication link;
wherein the at least one logic circuit is further configured to generate each of the symbols such that two or more bits are used to mark the beginning of the symbol and two or more bits are used to encode the data bit or to indicate that the symbol is a start symbol or a stop symbol; and wherein the bits used to encode the data bit or to indicate that the symbol is the start symbol or the stop symbol (denoted below as c, d) are:
c="1" if the data bit is "0" or if the symbol is a byte start symbol
"0" if the data bit is "1" or if the symbol is a byte stop symbol
d "1" if the data bit is "1" or if the symbol is a byte start symbol
"0" if the data bit is "0" or if the symbol is a byte stop symbol.

10. The apparatus according to claim 9, wherein the operation of the at least one digital logic circuit is based on a prefixed function or a downloadable software.

11. The apparatus according to claim 9, wherein the apparatus is a power electronic converter, comprising a control unit and a power unit with simultaneous mutual low frequency signal communication at less than 50 kHz frequency and mutual serial communication at higher than 1 Mbit/s data transmission frequency.

12. A system comprising a communication link having a signal transmitting end and a signal receiving end, wherein, at the signal transmitting end, a plurality of data bits is integrated into a low frequency signal to form an integrated signal, the system comprising:
at least one digital logic circuit at the signal transmitting end of the communication link, the at least one digital logic circuit configured to encode each of the plurality of data bits into symbols, integrate the symbols in the low frequency signal to form the integrated signal, wherein the state of some of the bits of each of the symbols are dependent on the state of the low frequency signal, form the symbols into bytes, which are identified by a separate start symbol, or by a separate stop symbol, or by both a start and a stop symbol, and separate the symbols from each other by a time delay which is longer than the filtering delay of the integrated signal at the signal receiving end of the communication link,
a decoder, at the signal receiving end of the communication link, configured to decompress the data bits included in the symbols of the integrated signal, from an integrated signal bit stream, and
a filtering delay block, at the signal receiving end of the communication link, configured to separate the low frequency signal from the integrated signal by delaying the integrated signal by a filtering delay which is longer than the duration of one symbol;
wherein the at least one digital logic circuit is further configured to generate each of the symbols such that two or more bits are used to mark the beginning of the symbol and two or more bits are used to encode the data bit or to indicate that the symbol is a start symbol or a stop symbol; and
wherein the bits used to encode the data bit or to indicate that the symbol is the start symbol or the stop symbol (denoted below as c, d) are:
c="1" if the data bit is "0" or if the symbol is a byte start symbol
"0" if the data bit is "1" or if the symbol is a byte stop symbol
d "1" if the data bit is "1" or if the symbol is a byte start symbol
"0" if the data bit is "0" or if the symbol is a byte stop symbol.

13. The system according to claim 12, wherein the operation of the at least one digital logic circuit is based on a prefixed function or a downloadable software.

14. The system according to claim 12, wherein the system is a power electronic converter, comprising a control unit and a power unit with simultaneous mutual low frequency signal communication at less than 50 kHz frequency and mutual serial communication at higher than 1 Mbit/s data transmission frequency.

* * * * *

UNITED STATES PATENT AND TRADEMARK OFFICE
CERTIFICATE OF CORRECTION

PATENT NO. : 10,917,269 B2
APPLICATION NO. : 16/473380
DATED : February 9, 2021
INVENTOR(S) : Petri Ylirinne et al.

Page 1 of 1

It is certified that error appears in the above-identified patent and that said Letters Patent is hereby corrected as shown below:

In the Claims

Column 7, Claim 1, Line 5, after "d" please insert -- = --.

Column 8, Claim 9, Line 8, after "d" please insert -- = --.

Column 8, Claim 12, Line 64, after "d" please insert -- = --.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*